(12) United States Patent
Nambirajan et al.

(10) Patent No.: US 12,041,085 B2
(45) Date of Patent: Jul. 16, 2024

(54) MACHINE LEARNING-BASED SENSITIVE RESOURCE COLLECTION AGENT DETECTION

(71) Applicant: Zoho Corporation Private Limited, Chengalpattu Taluk (IN)

(72) Inventors: Gouttham Nambirajan, Chennai (IN); Sita Lakshmi Sangameswaran, Kochadai (IN); Ramprakash Ramamoorthy, Maraimalai Nagar (IN); Shailesh Kumar Davey, Potheri (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 307 days.

(21) Appl. No.: 17/359,159

(22) Filed: Jun. 25, 2021

(65) Prior Publication Data

US 2021/0409445 A1  Dec. 30, 2021

Related U.S. Application Data

(60) Provisional application No. 63/083,059, filed on Sep. 24, 2020.

(30) Foreign Application Priority Data

Jun. 26, 2020 (IN) .............................. 202041027259

(51) Int. Cl.
*H04L 9/40* (2022.01)
*G06F 16/955* (2019.01)
(Continued)

(52) U.S. Cl.
CPC ........ *H04L 63/1483* (2013.01); *G06F 16/955* (2019.01); *G06N 3/02* (2013.01); *G06N 20/00* (2019.01)

(58) Field of Classification Search
None
See application file for complete search history.

(56) References Cited

U.S. PATENT DOCUMENTS 9,043,894 B1 * 5/2015 Dennison ............ H04L 63/1408
726/11
9,363,282 B1 * 6/2016 Yu ....................... H04L 63/0218
(Continued)

*Primary Examiner* — James R Turchen
(74) *Attorney, Agent, or Firm* — Ahmann Kloke LLP

(57) ABSTRACT

Obtaining one or more metrics associated with a network location. Determining, based on the one or more metrics and one or more prefatory check conditions, a prefatory status of the network location, the prefatory status indicating a benign status, malicious status, or a suspicious status. If the prefatory status of the network location indicates the benign status or the malicious status, providing a notification of the prefatory status in response to the prefatory status being determined. If the prefatory status of the network location indicates a suspicious status, obtaining a document object model of the network location. Obtaining a screenshot of an entire page of content at the network location. Generating a null hypothesis based on the document object model, the null hypothesis including a potential brand list, the potential brand list including one or more potential brands. Obtaining a set of reference images for each of the one or more potential brands of the potential brand list. Extracting one or more globally invariant visual features from the screenshot of the entire page of the content. Generating, based on a machine learning model using the one or more globally invariant visual features, an alternate hypothesis, the alternate hypothesis indicating a list of potentially malicious content brands. Determining, based on the null hypothesis and the alternate hypothesis and the machine learning model, a classification result. Performing one or more responsive actions in response to determining the classification result.

20 Claims, 10 Drawing Sheets

(51) Int. Cl.
  *G06N 3/02* (2006.01)
  *G06N 20/00* (2019.01)

(56) References Cited

U.S. PATENT DOCUMENTS

| | | | |
|---|---|---|---|
| 9,578,048 B1* | 2/2017 | Hunt | H04L 63/1416 |
| 2014/0033307 A1* | 1/2014 | Schmidtler | H04L 63/1483 |
| | | | 726/22 |
| 2015/0200962 A1* | 7/2015 | Xu | H04L 63/1483 |
| | | | 726/23 |
| 2020/0104488 A1* | 4/2020 | Li | G06F 40/221 |
| 2020/0104677 A1* | 4/2020 | Rae | G06N 3/084 |
| 2020/0204572 A1* | 6/2020 | Jeyakumar | G06F 21/566 |
| 2020/0272294 A1* | 8/2020 | Gan | G06F 3/0488 |
| 2020/0319857 A1* | 10/2020 | Lonial | G06F 3/0482 |
| 2021/0049516 A1* | 2/2021 | Rapp | G06N 20/00 |
| 2021/0182628 A1* | 6/2021 | Regina | G06F 18/2431 |
| 2021/0203693 A1* | 7/2021 | Clausen | H04L 63/1425 |
| 2021/0383144 A1* | 12/2021 | Price | G01S 19/396 |
| 2022/0199079 A1* | 6/2022 | Hanson | H04L 51/02 |

* cited by examiner

MACHINE LEARNING-BASED SENSITIVE RESOURCE COLLECTION AGENT DETECTION

CROSS-REFERENCE TO RELATED APPLICATIONS

The present application claims priority to Indian Provisional Patent Application No. 202041027259 filed Jun. 26, 2020, Indian Provisional Patent Application No. 202041038422 filed Sep. 5, 2020, and U.S. Provisional Patent Application Ser. No. 63/083,059 filed Sep. 24, 2020, which are hereby incorporated by reference herein.

DETAILED DESCRIPTION

Figure 1:
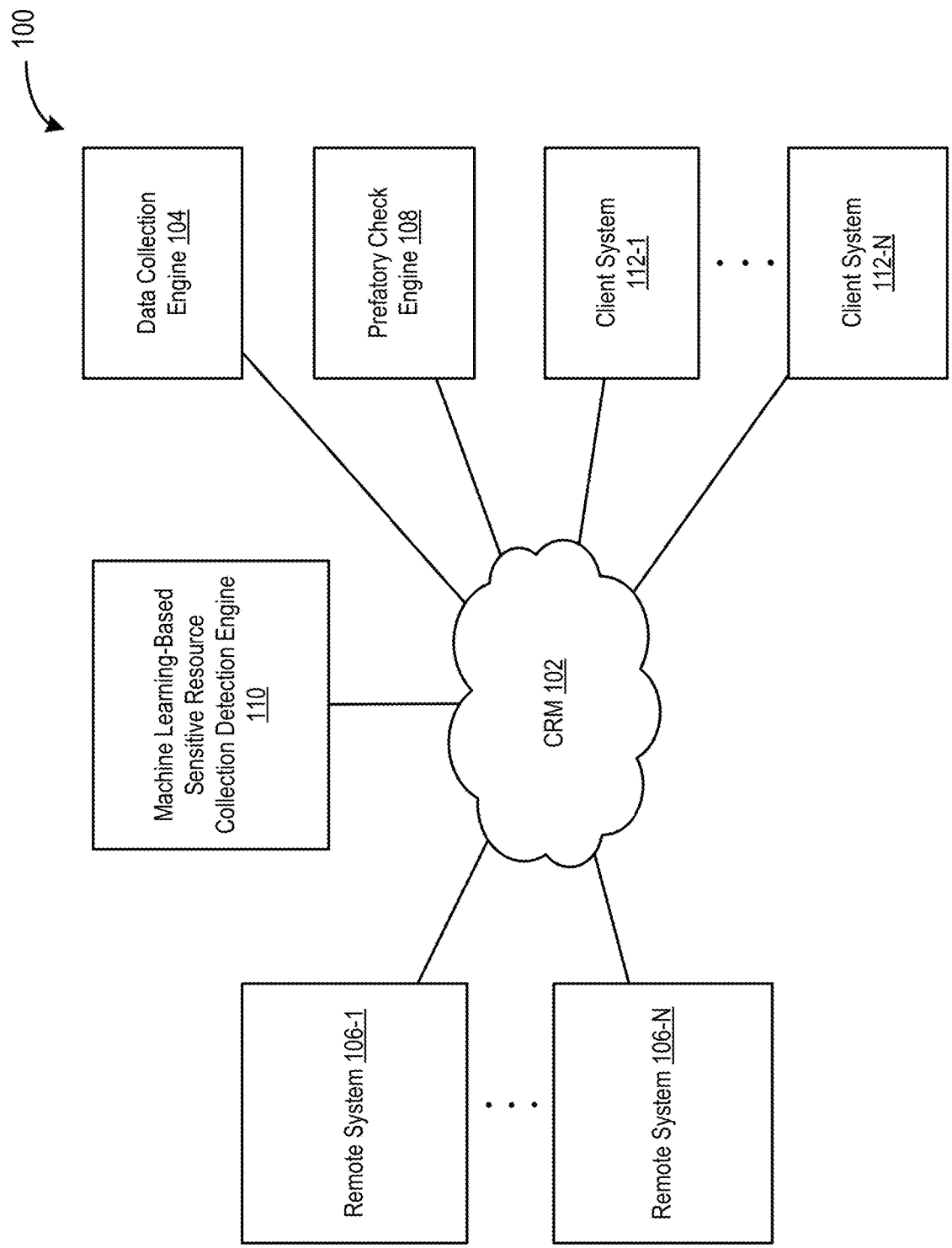
FIG. 1 is a diagram of an example of a system for detecting sensitive resource collection using machine learning.

FIG. 1 is a diagram 100 of an example of a system for detecting sensitive resource collection using machine learning. The diagram 100 includes a computer-readable medium (CRM) 102, a data collection engine 104 coupled to the CRM 102, remote systems 106-1 to 106-N (individually, the remote system 106, collectively, the remote systems 106) coupled to the CRM 102, a prefatory check engine 108 coupled to the CRM 102, a machine learning-based sensitive resource collection detection engine 110 coupled to the CRM 102, and client systems 112-1 to 112-N (individually, the client system 112, collectively, the client systems 112) coupled to the CRM 102.

The CRM 102 is intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, erasable programmable read-only memory (EPROM), or electrically erasable programmable read only memory (EEPROM), a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an integrated services digital network (ISDN) modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The data collection engine 104 is intended to represent an engine that obtains (e.g., collects) data from, and/or provides data to, various sources (e.g., internal and/or external sources coupled to the CRM 102). For example, the data collection engine 104 can collect metrics of content at a network location. Network locations can have Uniform Resource Locators (URLs) and/or other network location identifiers (e.g., Uniform Resource Identifiers (URIs), media access control (MAC) addresses, Internet Protocol (IP) addresses, Internationalized Domain Names and/or other types of Domain Names). In a specific implementation, content includes websites and/or portions thereof (e.g., webpages), applications (e.g., mobile applications) and/or portions thereof (e.g., pages or screens of a mobile application), and/or the like. Accordingly, content can include websites, webpages, documents, images, screenshots, videos, audio, and/or the like. In a specific implementation, metrics include network locations, metadata content (e.g., webpage or website metadata), types of content present within a webpage or other portion of content. For example, types of content can include a sign-up form, log-in form and/or other features. It will be appreciated that reference to a "network location" in this paper may also include the content associated with that network location. For example, reference to a network location in this paper may also refer to a webpage of a website at that network location. Similarly, reference to "content" in this paper may also include the network location associated with that content.

The remote systems 106 can function to provide (e.g., serve, host) and/or obtain content. A remote system 106 can be associated (e.g., owned, operated, and/or controlled by) with a particular brand (or, entity). For example, a particular remote system 106 may be a FACEBOOK® system serving Facebook webpages. In some embodiments, remote systems 106 may be either benign (e.g., legitimate) or malicious (e.g., illegitimate). For example, a Facebook remote system 106 can be considered a benign system that hosts benign content, while another remote system 106 may be considered a malicious system hosting a phishing website intending to emulate Facebook webpages (e.g., for purposes of stealing user information). It may not be apparent to a user or a typical computing system whether a remote system 106, and/or the associated content or network location, is benign or malicious.

The prefatory check engine 108 is intended to represent an engine that includes an entry point and a screening process to screen (e.g., filter out) a suspicious network location from blatantly benign network locations and/or blatantly malicious network locations. In a specific implementation, the prefatory check engine 108 routes, sends, or otherwise provides suspicious network locations to other components (e.g., the machine learning-based sensitive resource collection detection engine 110). Advantageously, the prefatory check engine 108 can improve scalability and accuracy of the systems and/or engines described herein.

The machine learning-based sensitive resource collection detection engine 110 is intended to represent an engine that uses machine learning (e.g., few-shot machine learning) to detect sensitive resource collection and/or one or more agents collecting the sensitive resources.

Sensitive resources include resources (e.g., data, information, user actions, code, executable, applications, computing devices or components) that a user unknowingly provides to, or provides access to, another entity (e.g., via a website or a mobile application to a phishing agent). For example, sensitive resource collection can be performed by a phishing attack, but in some instances, it may be performed in a more legitimate manner. For example, an agent can collect sensitive resources from a user in a manner that may be technically legal but nonetheless collects the resources without the user knowingly providing the resources.

In a specific implementation, an agent is a computing entity (e.g., a computer server hosting a phishing website) and/or other type of entity (e.g., a person, organization, company) that operates and/or controls a system that collects sensitive resources. As used herein, and for sake of illustrative clarity, it will be appreciated that sensitive resource collection detection can refer to the detection of the collection of the sensitive resources and/or the detection of the agents collecting the sensitive resources.

In some situations, malicious content can be used by agents to collect sensitive resources. Malicious content can include phishing websites and/or portions thereof (e.g., phishing webpages), phishing apps and/or portions thereof (e.g., phishing screens or pages of an application), infected content (e.g., content containing viruses), and/or other types of illegitimate and/or unsafe content (e.g., content that may not be suitable for a particular environment). For example, phishing websites often include viruses, so by detecting a phishing website, the system often detects websites containing viruses.

Under some approaches, phishing detection techniques revolve around the logos for brand identification. Instead of using localized features in an image, the machine learning-based sensitive resource collection detection engine 110 can use an entire screenshot of a webpage. The machine learning-based sensitive resource collection detection engine 110 can also address the problem of huge training data requirements for brand identification in the sensitive resource collection detection space to provide enhanced browser security to organization endpoints. To reduce the computational burden and time required for data collection, the machine learning-based sensitive resource collection detection engine 110 can use a few-shot learning technique (e.g., rather than a generic Convolutional Neural Network (CNN)).

For example, in order to use CNN to match the logo in a web page with a pre-defined closed set of brand logos (Candidate brands), the malicious webpage is expected to contain a complete logo. The comparison of the detected brand logo to the candidate brand is not addressed in case of partial or no logo on the web page when using CNN. Techniques using CNN can require approximately 10× training data and time than required by the machine learning-based sensitive resource collection detection engine 110 and/or other systems described herein.

Whereas most machine learning based object categorization algorithms require training on hundreds or thousands of samples/images and very large datasets, one-shot learning aims to learn information about object categories from one, or only a few, training samples/images. In a specific implementation, the machine learning-based sensitive resource collection detection engine 110 utilizes few-shot learning. (The term "few-shot learning" is used in this paper instead of "one-shot learning" to make it clear a small number of training samples/images, e.g., between 1 and 15, exclusive, are used; while there is some overlap in one-shot and few-shot learning, one-shot learning is assumed to use fewer than 6 training samples/images.) In such a specific implementation, the machine learning-based sensitive resource collection detection engine 110 can be characterized as a few-shot machine learning-based sensitive resource collection detection engine 110. In a specific implementation, 5 images per class results in about 75-80% accuracy. The accuracy drops to about 70% with 4 images per class, 60% with 3 images per class, and 50% with 2 images per class. Whether a lower accuracy is adequate for a given purpose may depends upon the number of classes, with a higher number of classes resulting in lower accuracy being acceptable. However, in a specific implementation, few-shot learning with over 70% accuracy is considered an acceptable accuracy threshold.

Phishing is a primary source of a data breaches in many SAAS-based companies. Using just a list of blacklisted sites and the firewall to prevent the exfiltration of sensitive data from an organization has become obsolete. Furthermore, with the massive expansion of novel top-level-domains, DNS compromise, and transient TTL of a phishing domain, it becomes cumbersome to manually verify phishing pages. One of the goals of the systems and methods described in this paper is to provide holistic end-point protection from browser-based phishing attacks and/or other sensitive resource collection. For example, the systems described herein can proactively determine and alert a user or another computing system if a webpage is phished or includes other sensitive resource collection, which may help to prevent unobservant data leakage and/or to incite remedial measures.

Sensitive resource collection detection with visual approaches can lead to higher accuracy. However, incorporating CNN for extracting visual vectors requires a large amount of training data in the magnitude of a thousand samples for each candidate brand. Aggregation of such enormous data is a convoluted and prolonged task and impedes the development time. Further, as the webpages are susceptible to UI/UX changes, constant updating of the model becomes inevitable. Re-collecting data and re-training CNN to update the model imposes a huge overhead in the model maintenance. Hence, taking into account these issues, the systems and methods described herein provide a novel framework in the sensitive resource collection detection pipeline that can incorporate feeding an entire screenshot of a webpage to a few-shot learning based neural network. In some embodiments, this few-shot technique would require fewer than 15 images for each candidate brand to capture the class variance successfully, thus significantly decreasing the data requirement. Also, the systems and methods describe in this paper shows that concentrating on globally invariant features is more reliable in constructing the visual feature vector than focusing on localized features such as logo, favicon, navbar, and/or the like.

The client systems 112 can function to obtain, provide, and/or present (e.g., display) content. For example, a user may interact with a client system 112 to view a webpage, access a mobile application, input information into a webpage or a mobile application, and/or the like. The client system 112 may provide information (e.g., user inputted information) to various remote systems over a network.

Figure 2:
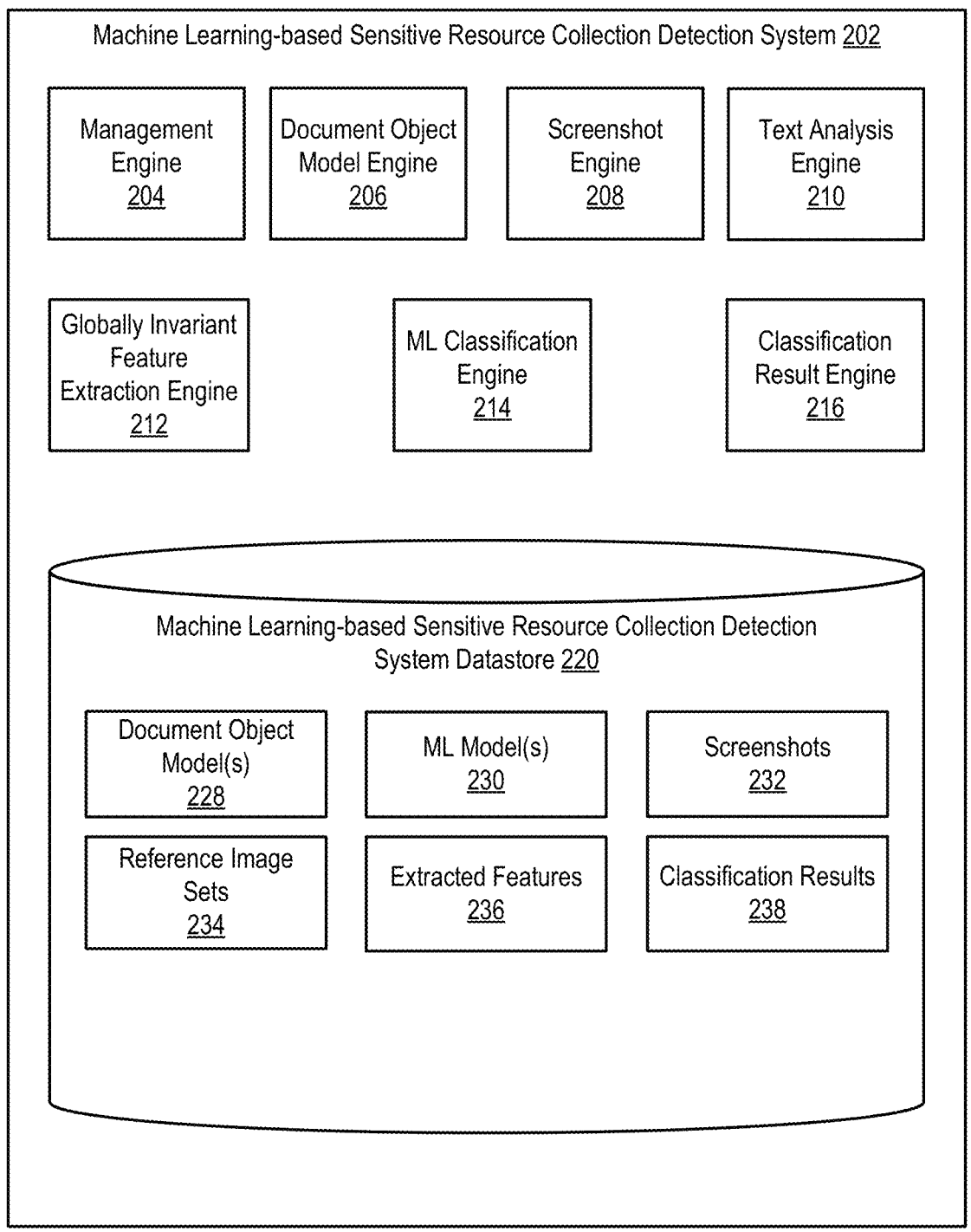
FIG. 2 is a diagram of an example of a machine learning-based sensitive resource collection detection system.

FIG. 2 is a diagram 200 of an example of a machine learning-based sensitive resource collection detection system 202. In the example of FIG. 2, the machine learning-based sensitive resource collection detection system 202 includes a management engine 204, a document object model engine 206, a screenshot engine 208, a text analysis engine 210, a globally invariant feature extraction engine 212, a machine learning classification engine 214, a classification result engine 216, and a machine learning-based sensitive resource collection detection system datastore 220.

The management engine 204 is intended to represent an engine that manages (e.g., create, read, update, delete, or otherwise access) document object model(s) 228, machine learning model(s) 230, screenshots 232, reference image sets 234, globally invariant features (e.g., extracted features) 236, and/or classification results 238. Components 228-238 may or may not be stored in the machine learning-based sensitive resource collection detection system datastore 220 and/or other datastore(s) associated with the machine learning-based sensitive resource collection detection system 202. The management engine 204 may perform any of these operations manually (e.g., by a user interacting with a GUI) and/or automatically (e.g., triggered by one or more of the engines 206-216). Like other engines described herein, some or all the functionality of the management engine 204 may be included in and/or cooperate with one or more other engines (e.g., engines 206-216).

The document object model engine 206 is intended to represent an engine that provides, obtains, and/or generates a document object model (DOM) 228 of a network location, such as a suspicious URL. In a specific implementation, the document object model engine 206 scrapes network location, and/or content thereof (e.g., webpages), to obtain the document object model 228. A document object model 228 may be a cross-platform and/or language-independent interface that treats an XML or HTML content as a tree structure wherein each node may be an object representing a part of the content. The document object model may represent content with a logical tree.

The screenshot engine 208 is intended to represent an engine that provides, obtains, and/or otherwise captures content. In a specific implementation, the screenshot engine 208 scrapes a network location and/or content thereof (e.g., webpages) to obtain a screenshot of content. For example, the screenshot engine 208 may obtain a screenshot of an entire webpage of a website (e.g., as opposed to only a portion of a webpage).

The text analysis engine 210 is intended to represent an engine that analyzes data to reach a null hypothesis. The null hypothesis can include both a feature vector and a potential candidate brand list (or, simply, potential brand list). It will be appreciated that although the term "list" is used in this paper, other types of structures (e.g., graphs, trees) may be used instead of, or in addition to, lists. In a specific implementation, the text analysis engine 210 constructs the feature vector by parsing the content for representative features indicating sensitive resource collection. For example, the representative features can be elements and/or characteristics of a webpage that makes the webpage more disposed to be malicious content (e.g., a webpage that performs sensitive resource collection) than benign content. In some embodiments, the feature vector can include 32 features which are scraped from network location and the DOM. For example, the features can include frequent domain name mismatch, iFrame present, external favicon loader, percentage of self-redirect hyperlinks, logo, content-delivery network (top-level domain different), login/signin page (discard if it doesn't have), how many sites loaded from, and cookies set at usual site, to name several examples. Advantageously, feature engineering is unnecessary. The text analysis engine 210 can obtain the potential brand list by parsing the content (e.g., a webpage document) for meta information.

The text analysis engine 210 may or may not provide (e.g., route) feature vector and/or the potential brand list to other components (e.g., machine learning classification engine 216) for further processing.

The globally invariant feature extraction engine 212 is intended to represent an engine that extracts globally invariant features (e.g., visual features) like layout information, CSS template, name placement, logo placement, and/or the like, from a screenshot 232 and/or other content. In a specific implementation, the globally invariant feature extraction engine 212 generates embeddings from the extracted features 236. For example, an embedding can be a mapping from discrete objects, such as words or images, to vectors of real numbers. In some embodiments, the globally invariant feature extraction engine 212 can extract features from screenshots 232 (e.g., of suspicious webpages) and from reference image sets 234. Reference image sets 234 can comprise sets of images for potential brands and can include a plurality of examples of benign content and/or malicious content of an associated brand of the potential brand list. The globally invariant feature extraction engine 212 can obtain the reference image sets 234 from local and and/or external datastores. The globally invariant feature extraction engine 212 can be custom trained (e.g., during training time, deployment time, and/or run-time). For example, updated reference image sets 234 can be used to custom train the globally invariant feature extraction engine 212.

The machine learning classification engine 214 is intended to represent an engine that determines a classification result (e.g., for a network location and/or content). For example, the machine learning classification engine 214 may use a few-shot machine learning model 230 (e.g., a few-shot learning based neural network model 230) to determine a classification result for content. A classification result may include a classification label indicating benign or malicious. In a specific implementation, the machine learning classification engine 214 uses extracted features or embeddings as input to the machine learning classification engine 214 and/or components thereof (e.g., few-shot machine learning model 230). For example, a few-shot approach described herein can be metric learning with 512 feature embedding.

Metric learning is the task of learning a distance function over objects. A metric or distance function has to obey four axioms: non-negativity, identity of indiscernibles, symmetry and subadditivity (or the triangle inequality). In practice, metric learning algorithms ignore the condition of identity of indiscernibles and learn a pseudo-metric. Some well-known approaches for metric learning include learning from relative comparisons, large margin nearest neighbor, and information theoretic metric learning (ITML). As used in this paper, metric learning is an approach in which the model learns to construct class vectors or embeddings which has low intra-class and high inter-class variations. This can, for example, prevent the network from overfitting even when the dataset is extremely minimalistic. In some embodiments, the model 230 can be fine-tuned (e.g., at run-time) using reference image sets 234.

In a phishing detection context, a difference between pages will be minimal; pages could be nearly identical or the difference could even be invisible to naked eye. Advantageously, many other variables are considered, making metric and few-shot learning viable for checking images that are not very different, allowing detection of nominal differences. For example, cosine similarity metric used with few-shot works with as few as 5 images using few-shot learning and metric learning together; the cosine similarity metric provides the difference between legitimate and phishing sites. Cosine distance allows image differentiation from very similar differences.

In a specific implementation, the machine learning classification engine 214 can compare feature embedding of a candidate brand reference image sets 234 (e.g., Facebook webpages) and the feature embedding of suspicious content to determine similarity scores which can indicate (or, explain) the extent to which the suspicious content imitates the candidate brands. Advantageously, feature extraction can be combined with cosine similarity for phishing detection. When using convolutional neural network, in a specific implementation, a first step is to extract features representative of, in an applicable context, web pages (as described previously). Using cosine similarity, even with minor variants, image requirements are minimized.

The classification result engine 216 is intended to represent an engine that performs one or more responsive actions. For example, the classification result engine 216 can perform actions in response to the determination of a classification result. The action can include adding the network location to a whitelist if the class label indicates benign or adding the network location to a blacklist if the class label indicates malicious. The classification result engine 216 may also notify a user if the class label indicates malicious.

Figure 3:
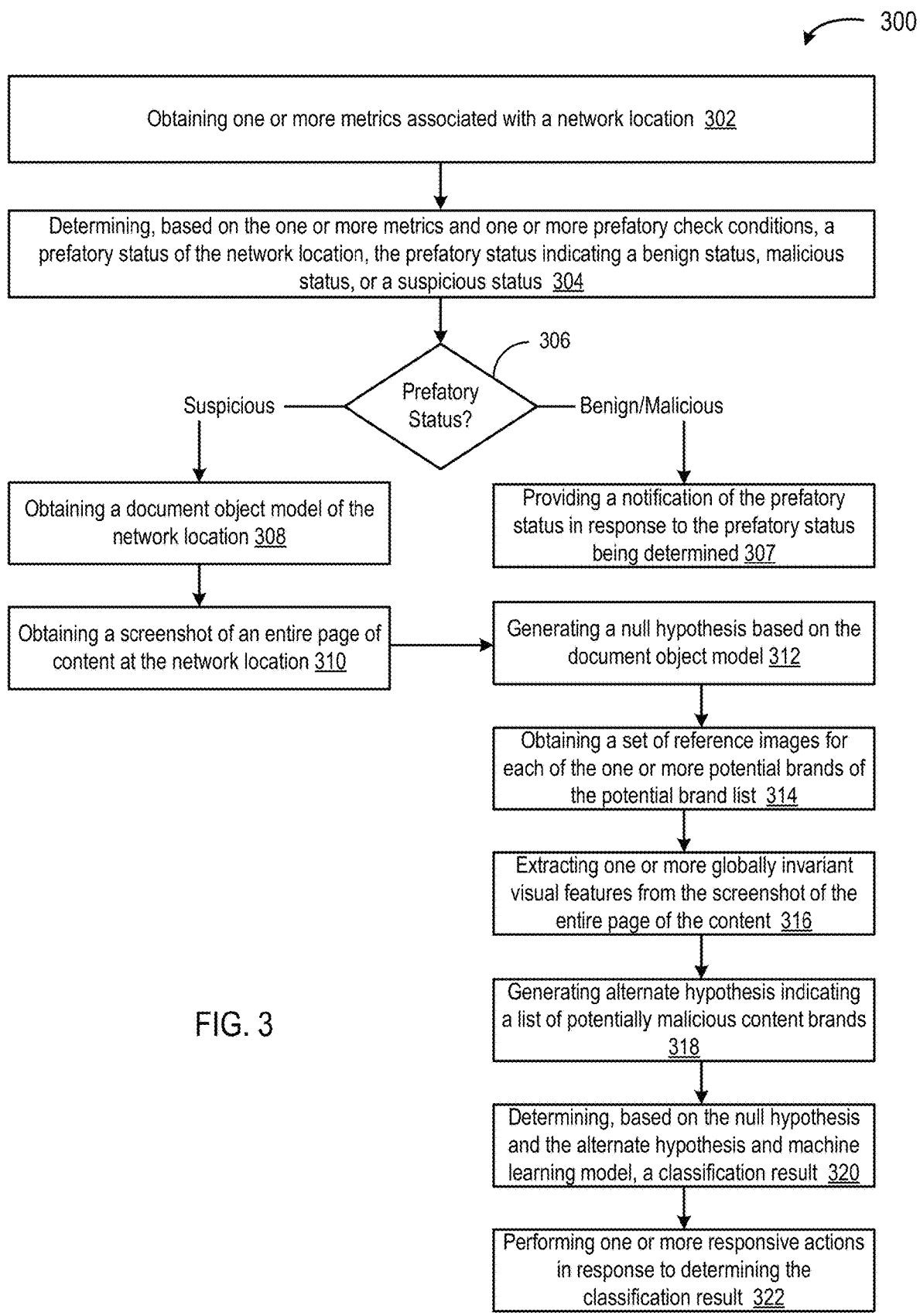
FIG. 3 is a flowchart of an example of a method of detecting sensitive resource collection using machine learning.

FIG. 3 is a flowchart 300 of an example of a method of detecting sensitive resource collection using machine learning. In this and other flowcharts and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed, but may have been included for the sake of illustrative clarity.

The flowchart 300 starts at module 302 with obtaining one or more metrics associated with a network location. In a specific implementation, a data collection system obtains the one or more metrics.

The flowchart 300 continues to module 304 with determining, based on the one or more metrics and one or more prefatory check conditions, a prefatory status of the network location. In a specific implementation, a prefatory check system determines the prefatory status. The prefatory check system may obtain the one or more metrics from the data collection system over a network. In a specific implementation, the prefatory status indicates a benign status, a malicious status, or a suspicious status.

The flowchart 300 continues to decision point 306 with determining prefatory status. If the prefatory status of the network location indicates the benign status or the malicious status (306—benign/malicious), the flowchart 300 ends at module 307 with providing a notification (e.g., to a user or a computing system) of the prefatory status in response to the prefatory status being determined.

If, on the other hand, the prefatory status of the network location indicates a suspicious status, the flowchart 300 continues to module 308 with obtaining a document object model of the network location. In some embodiments, a document object model engine obtains the document object model. For example, the prefatory check system may provide the network location to a machine learning-based sensitive resource collection detection system in response to the prefatory status indicating a suspicious status.

The flowchart 300 continues to module 310 with obtaining a screenshot of an entire page of content at the network location. In a specific implementation, a screenshot engine obtains the screenshot.

The flowchart 300 continues to module 312 with generating a null hypothesis based on the document object model. The null hypothesis can include a potential brand list, and the potential brand list can include one or more potential brands. In a specific implementation, a text analysis engine generates the null hypothesis.

The flowchart 300 continues to module 314 with obtaining a set of reference images for each of the one or more potential brands of the potential brand list. In a specific implementation, a globally invariant feature extraction engine obtains the set of reference images.

The flowchart 300 continues to module 316 with extracting one or more globally invariant visual features from the screenshot of the entire page of the content. For example, the one or more globally invariant visual features include any of layout information of the content, a Cascading Style Sheets (CSS) template, name placement in the content, or logo placement of the content. In a specific implementation, the globally invariant feature extraction engine extracts the one or more globally invariant visual features from the screenshot of the entire page of the content.

The flowchart 300 continues to module 318 with generating, based on a machine learning model (e.g., a few-shot learning based neural network model) using the one or more globally invariant visual features, an alternate hypothesis. The alternate hypothesis can indicate a list of potentially sensitive resource collection brands. In a specific implementation, a machine learning classification engine generates the alternate hypothesis.

The flowchart 300 continues to module 320 with determining, based on the null hypothesis and the alternate hypothesis and the machine learning model, a classification result. For example, the classification result may include a class label indicating malicious or benign content, and/or associated network locations. In a specific implementation, a machine learning classification engine determines the classification result.

The flowchart 300 continues to module 322 with performing one or more responsive actions in response to determining the classification result. For example, the one or more response actions can include any of adding the network location to a whitelist if the class label indicates benign or adding the network location to a blacklist if the class label indicates malicious. In a specific implementation, a classification result engine performs the one or more responsive actions.

In a specific implementation, a machine learning-based sensitive resource collection detection system can adapt (e.g., fine-tune) a machine learning model to the set of reference images after prefatory status is determined and prior to extracting one or more globally invariant visual features from a screenshot of an entire page of the content.

Figure 4:
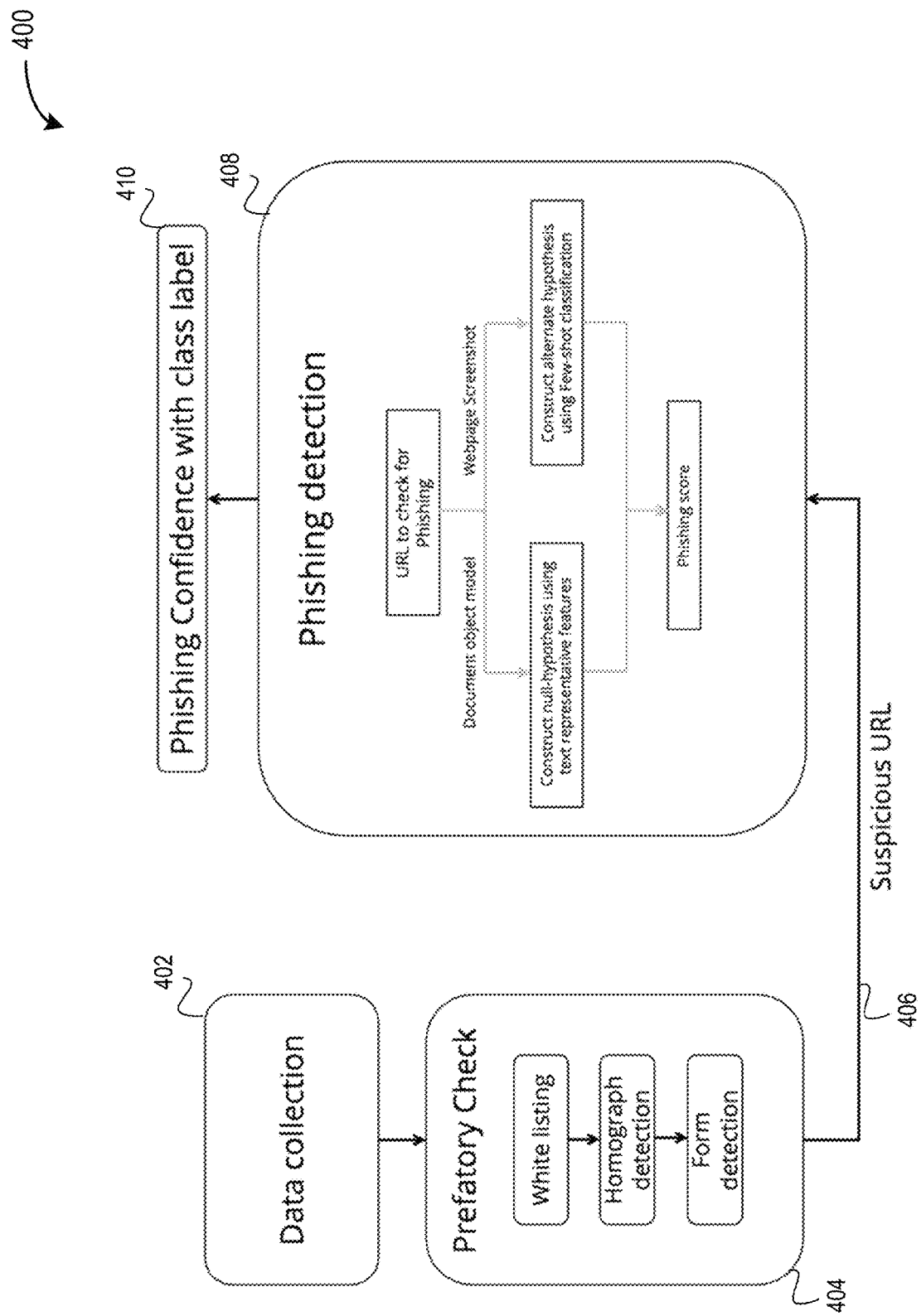
FIG. 4 is a flowchart of an example of an overview of a machine learning-based sensitive resource collection detection method.

FIG. 4 is a flowchart 400 of an example of an overview of a machine learning-based sensitive resource collection detection method. In module 402, a data collection system obtains metrics from a network location and/or content associated therewith (e.g., a webpage), and routes them to a prefatory check system. In module 404, the prefatory check system performs a screening process. The screening process contains three stages, stacked upon the other, in consideration with the following principles: 1) The probability of a network location being dispatched by a stage and 2) processing time for each stage. The stages check against a whitelisted database, then check for the presence of Homograph or Internationalized Domain Names and then check for the presence of login or sign-up form on the webpage. If a network location satisfies the conditions of anyone stage in the prefatory screening, it is not passed to the next stage and is immediately reported to the user with the respective benign/malicious status as that of the stage which it passed through. If the network location does not satisfy this prefatory check, it is routed (406) to another system (e.g., machine learning-based content detection system), which takes up the authority to declare the final status of the network location, including phishing detection at module 408 and phishing confidence with class label at module 410.

Figure 5:
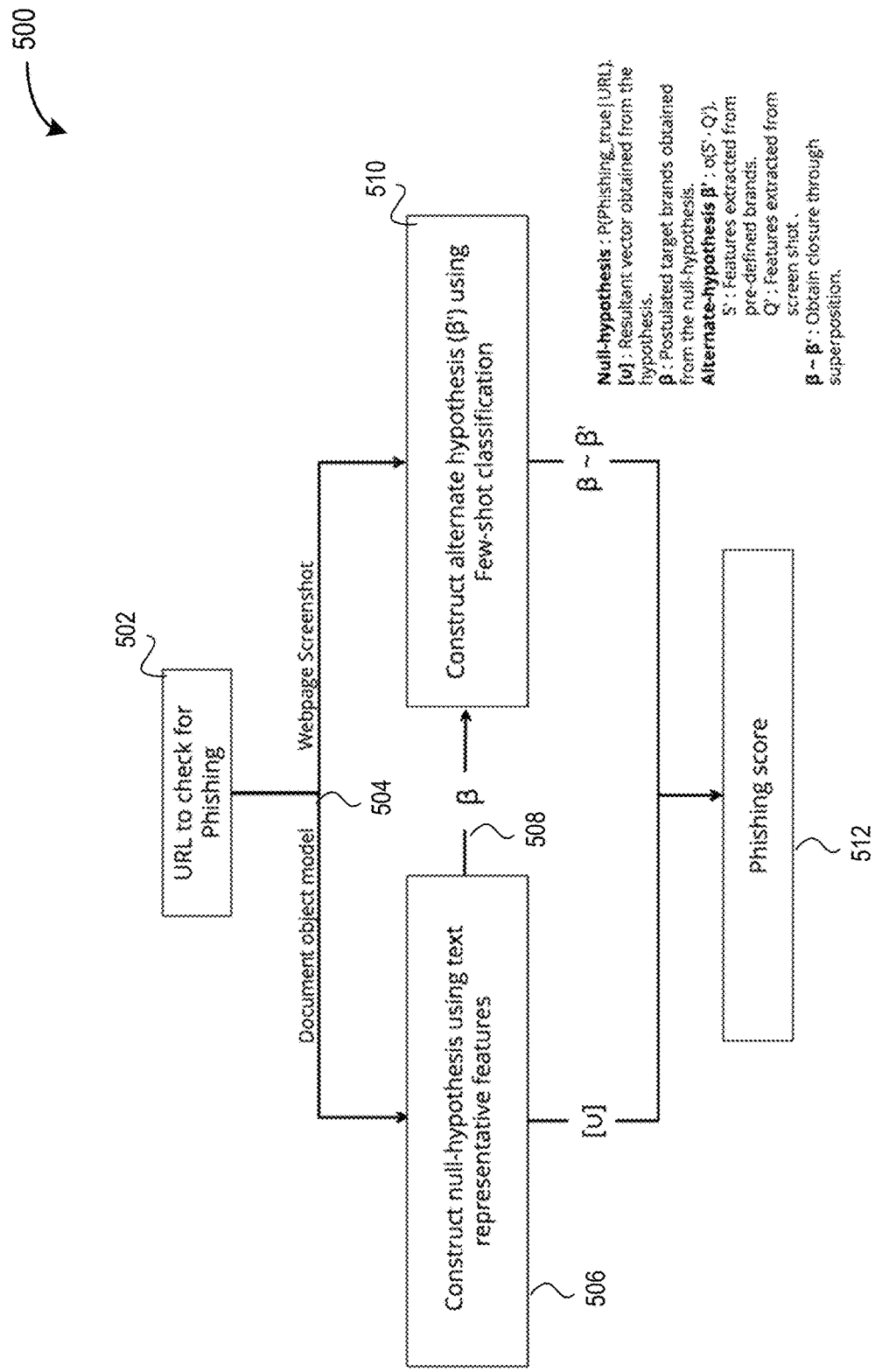
FIG. 5 is a flowchart of an example of a method of operation of a machine learning-based sensitive resource collection detection system.

FIG. 5 is a flowchart 500 of an example of a method of operation of a machine learning-based sensitive resource collection detection system. In module 502, the suspicious network location is input to a machine learning-based content detection system. The document object model of that respective network location is scraped along with the webpage screenshot corresponding to it (504).

In module 506, the obtained document object model is passed to a text analysis engine which then formulates the null hypothesis or the basis. This null hypothesis can include both a feature vector and a potential candidate brand list. The feature vector [v] can be constructed by parsing the document for representative features indicating sensitive resource collection. The representative features can be elements or characteristics of a webpage that makes the webpage more disposed to be a phishing site than a normal one. The vector can include 32 features which are scraped from the network location and the document object model. For example, the features can include frequent domain name mismatch, iFrame present, external favicon loader, percentage of self-redirect hyperlinks, and/or the like. This vector can then be routed to a pre-trained classifier (e.g., of a machine learning classification engine) which predicts the label. The training data for this classifier can be sourced from internal web proxy datasets (e.g., squid log), anti-phishing site datasets (e.g., PHISHTANK®, Openphish, and/or UNIMAS), or the like. The potential brand list [β] can be obtained by parsing the content for meta information. The brand list can then be routed to a few-shot classification engine (508). In order to identify the candidate brand from the suspicious network location, the screenshot that was taken from that respective webpage is passed to the machine learning classification engine. In addition to the null hypothesis framed from the previous module, the machine learning classification engine can determine the alternate hypothesis (module 510).

Traditionally in visual-based phishing approaches, the localized features like, logo or favicon are detected from the screenshot using an object detection CNN and compared with the candidate brand logos to ascertain the targeted brand. There are two pitfalls to this approach. Firstly, if the logo or favicon is not present or partially present in the screenshot, then the comparison or object detection would not work. Secondly, CNN requires voluminous data and computing power. Hence, to overcome these issues, the systems and methods described in this paper can use the entire screenshot which includes a range of visual attributes like the overall webpage layout, CSS template, name placement, and/or the like, for comparison. Instead of CNN, the machine learning classification engine using the few-shot learning described herein can solve the data requirement problems of using CNN. Advantageously, by decreasing compute requirements, improvements in the function of a computer are achieved.

In module 512, the machine learning classification engine can use the null-hypothesis and the alternate hypothesis to determine a phishing score or, more broadly, a classification result.

Figure 6:
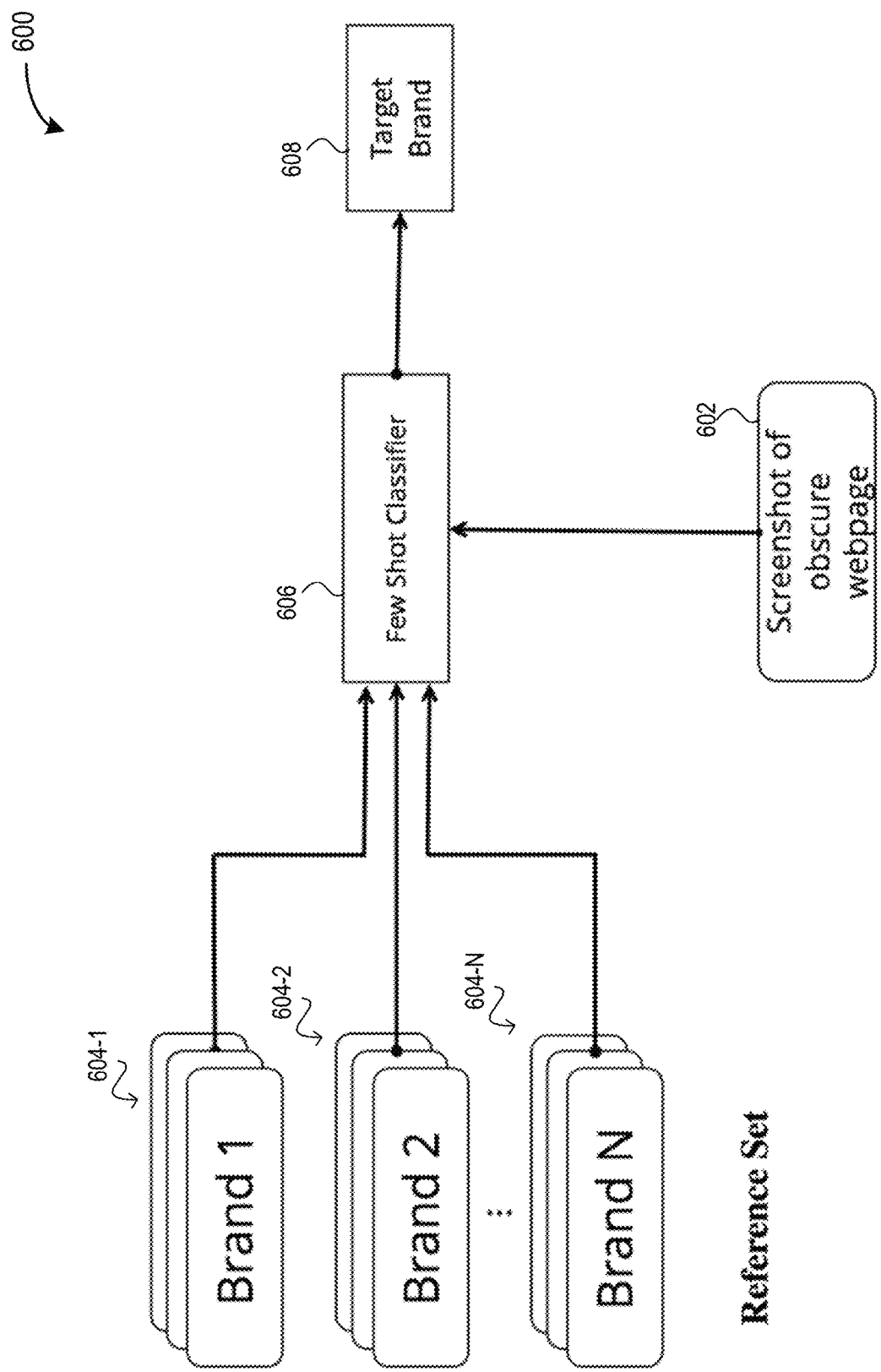
FIG. 6 is a diagram of an example architecture of a machine learning classification engine.

FIG. 6 is a diagram 600 of an example architecture of a machine learning classification engine. As depicted in FIG. 6, the screenshot 602 of the suspicious network location webpage is classified in accordance with the training set present for each brand. Multiple examples of benign and/or malicious content of a particular brand can be grouped together to form the reference image set for that particular brand (image reference sets 604-1 to 604-N). (It may be noted that a malicious content brand is typically content that includes a brand without permission of the brand owner for the purpose of phishing or some other unauthorized purpose.) In some embodiments, it may be mandatory to keep the reference image set or support set relevant. The more relevant the support set, the greater is the accuracy of the few-shot classifier 606 in identifying the target brand 608.

Figure 7:
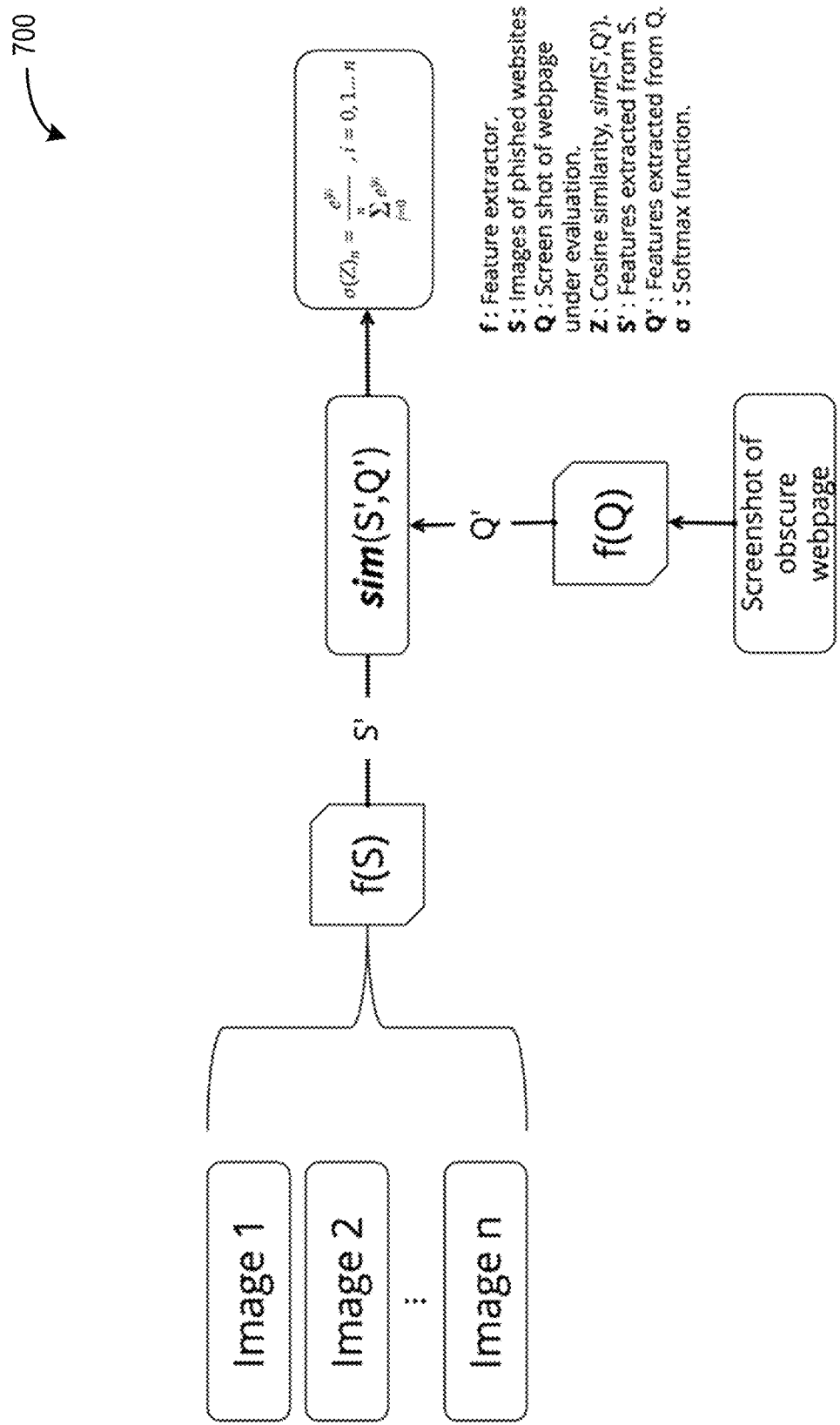
FIG. 7 is a diagram of an example few-shot classifier implementation of a machine learning classification engine.

FIG. 7 is a diagram 700 of an example few-shot classifier implementation of a machine learning classification engine. The diagram 700 depicts a matching network architecture implemented by the few-shot classifier of the machine learning classification engine to perform the few-shot classification. In some embodiments, it may be necessary that the feature vector of the suspicious webpage (e.g., FIG. 9) (Q') should be in context with the reference image set (e.g., FIG. 8). This can, for example, be attained by fine-tuning the model of the machine learning classification engine with the reference images and it can be performed to obtain the context of the image reference set, rather than to train the entire network from scratch. Accordingly, the learning rate can be low (e.g., lower than techniques using CNN) and the context is obtained at an accelerated pace (e.g., relative to techniques using CNN). In some embodiments, the machine learning classification engine can adapt the model to the reference image set within a few seconds. Once the model is adapted (e.g., fine-tuned), the embedding of the suspicious webpage can be generated with respect to the context of the reference images. In some embodiments, whenever the reference set gets updated drastically (e.g., updated at or above a particular threshold amount), fine-tuning may be necessary and/or performed responsively and/or in real-time. The feature embedding of the candidate set and the suspicious web page can be compared to each other using cosine similarity (other similarity/distance measures like Jaccard similarity, Euclidean distance can also be used). Given two vectors of attributes, S' and Q', the cosine similarity, $\cos(\theta)$, is represented using a dot product and magnitude as $$\text{similarity} = \cos(\Theta) = \frac{S' \cdot Q'}{\|S'\| \|Q'\|} = \frac{\sum_{i=1}^{n} S'_i Q'_i}{\sqrt{\sum_{i=1}^{n} S'^2_i} \sqrt{\sum_{i=1}^{n} Q'^2_i}}$$

where $S_i'$ and $Q_i'$ are components of vector S' and Q' respectively.

This can provide the similarity scores which can indicate or explain to what extent the suspicious content imitates the candidate brands. From these similarity scores, the probability distribution can be calculated across the candidate brands using softmax function($\sigma$), also known as softargmax or normalized exponential function. The softmax function takes as input a vector z of K real numbers, and normalizes it into a probability distribution consisting of K probabilities proportional to the exponentials of the input numbers. The outputs of the softmax function can lie in the range from 0 to 1, with larger input components corresponding to larger probabilities, and sum up to 1. Hence, the softmax function is used as the last activation function of a neural network to normalize the output of a network to a probability distribution over predicted output classes. This is taken as the alternate hypothesis ($\beta'$). The alternate hypothesis depicts the list of potentially malicious brands and their probability distributions.

In order to achieve the superposition [$\beta \sim \beta'$] between the basis and alternate hypothesis, we resort to heuristic-based approaches. We posit the result as that brand which has the maximum probability in the alternate hypothesis and also belongs to the set of the null hypothesis. This result can then be subjected to an additional verification step to reduce false positives. For this verification, the machine learning classification engine can take into consideration the invariant characteristics in every legitimate candidate brand, like the domain name, the internal CDN domain, and/or the like. These properties are compared for both the suspicious network locations and the candidate brand of the result obtained. This comparison yields the result of the overall pipeline. The result (e.g., classification result, phishing score, and/or the like) contains the malicious or benign class label along with the probability of the potentially malicious/phished brands. As an example, if the classification result is zero, then it is classified as a legitimate network location and added to the whitelist, else if the classification result is one, then it is classified as malicious (e.g., phished) network and added to the blacklist and the user is alerted.

It should be noted that input to softmax comes from cosine similarity. In a phishing context, first identify which brand has been phished, then use a normalized exponential engine to determine if a website is a phishing website.

In some embodiments, the accuracy of the few-shot learning of the machine learning classification engine can be enhanced with an "auto refresher" module/engine which automatically updates the reference training data set. In one scenario this "auto refresher" module/engine executes a script that periodically accesses the network locations (e.g., websites) of a given brand and fetches new or updated website screenshots for that brand for retraining purposes.

Figure 8:
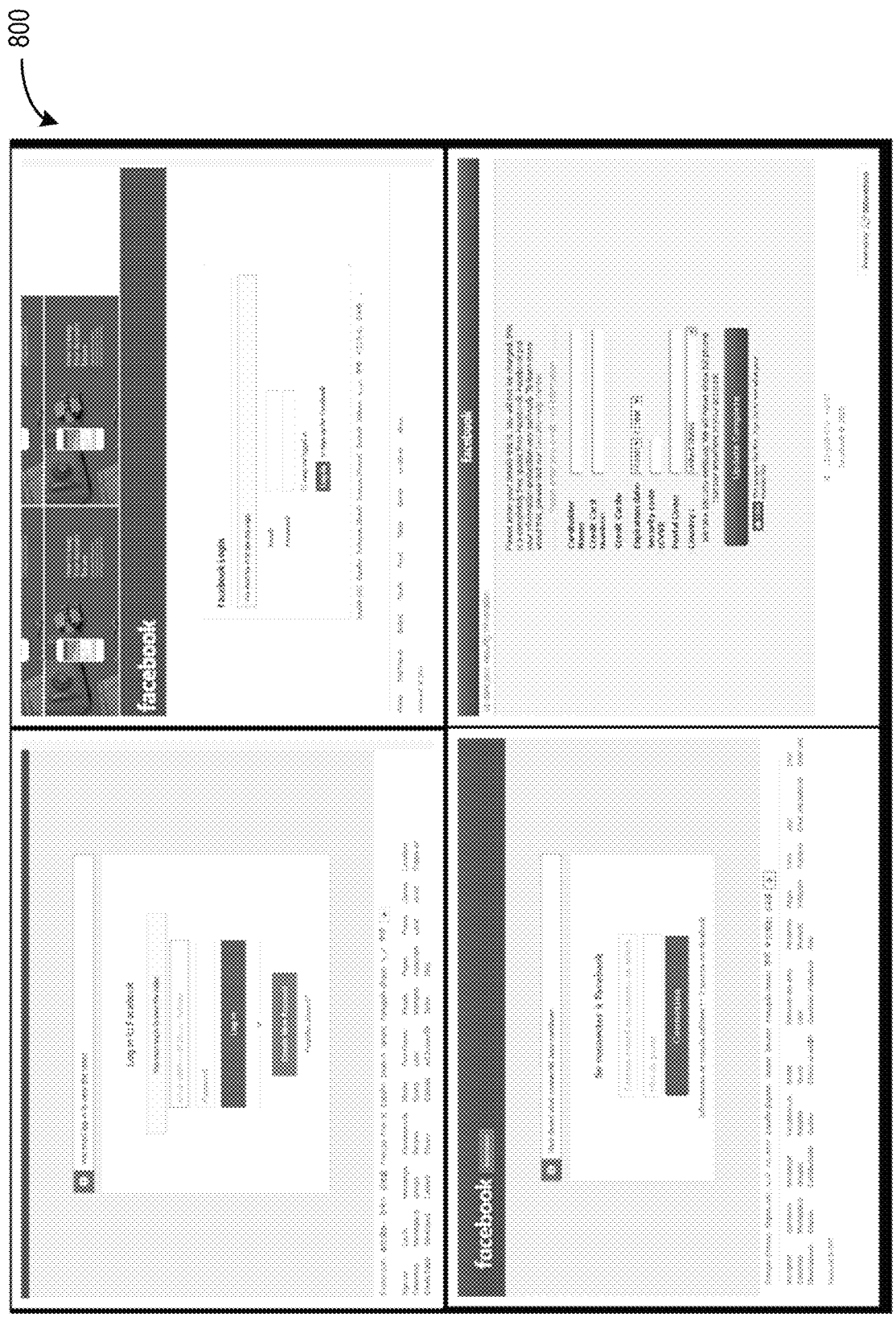
FIG. 8 depicts example reference set images.
Figure 9:
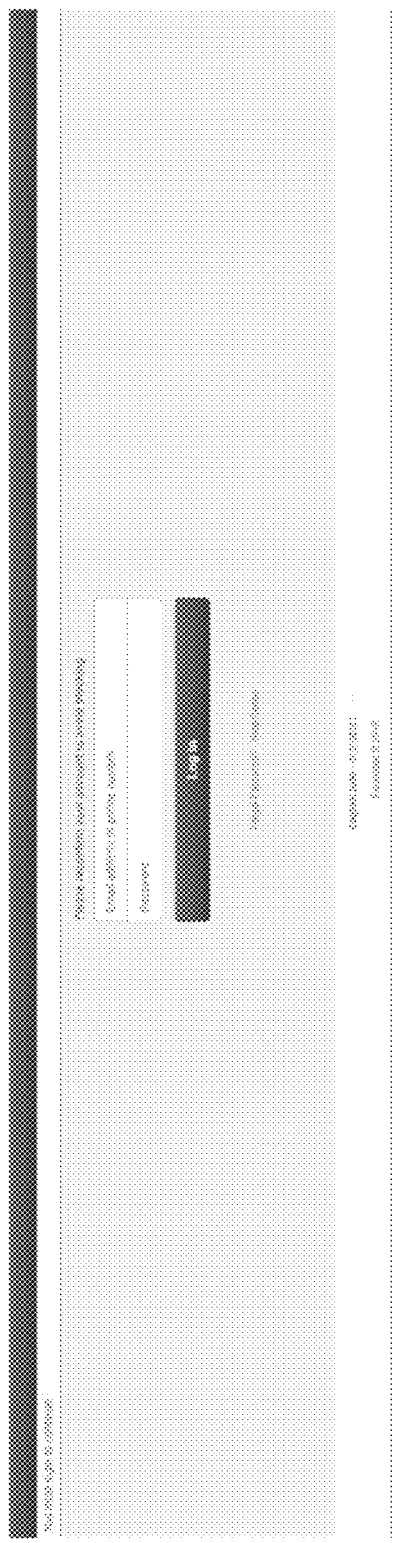
FIG. 9 is an example suspicious query image.

FIG. 8 depicts example reference set images 800. As shown, the reference set images 800 include example benign Facebook webpages. FIG. 9 is an example suspicious query image 900. As shown, a suspicious query image is shown which may be attempting to emulate a legitimate or benign Facebook page.

Figure 10:
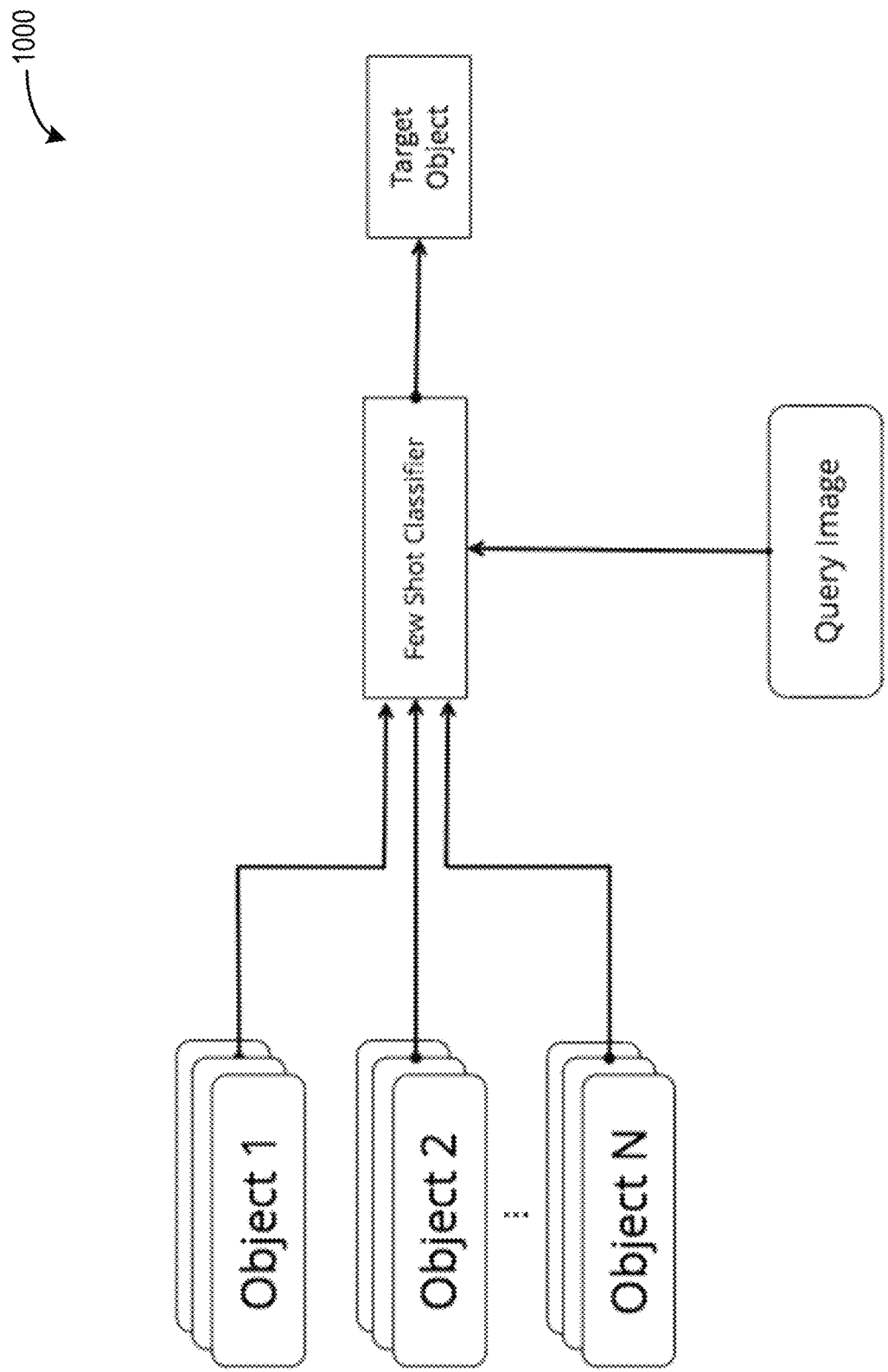
FIG. 10 is a diagram of an example few-shot architecture for low-code development platforms (LCDPs).

FIG. 10 is a diagram of an example few-shot architecture for low-code development platforms (LCDPs). This architecture may be applied for any application that requires classification. Accordingly, this architecture may be applied to the systems and/or engines described in this paper.

LCDPs provide opportunities for its user base to build their custom AI based image classification models. However, the training data requirements to build custom models is huge. The systems and methods described herein can apply few-shot learning techniques over a low code platform, so that the end user can build high quality image classification models with very limited amounts of training data (e.g., from as low as 5 images). Advantageously, by decreasing compute requirements, improvements in the function of a computer are achieved. In general, to classify an image into a certain category, the systems described herein use image classification. On the other hand, if an objective is to identify the location of objects in an image, and, for example, count the number of instances of an object, the systems described herein can also use object detection.

Generally, LCDP is a software that provides graphical user interfaces (GUIs) developers to create their own application software. The technicalities such as database, programming standards and methods, business processes, deployment infrastructure and/or the like, are abstracted from the developers, thus enabling them to focus entirely on the application's front-end aspects. This can reduce the amount of traditional hand coding, thereby enabling accelerated application software development and deployment.

An LCDP provides various functional aspects such as text fields, email field, phone number field, artificial intelligence field, and/or the like, to help end users with limited programming skills to build complex applications. When it comes to artificial intelligence, text processing, object detection and/or the like, are provided as simple, easy to use functions. An objective can be to provide a custom object classification using a few-shot approach via the LCDP. This can enable the end user to train high quality image classification models with a lesser amount of data, from as low as 5 images per class. Generally, custom object classification requires a large quantity (order of a few hundreds to thousands per class) of training data to train a model tailored to user's requirements.

If a custom image classification model had to be trained by the user, huge computational requirements and data could be major concerns. An LCDP can abstract infrastructure and huge computing requirements by cloud architecture. Now even within the LCDP, the user may not be able to collect/supply the huge training data required for training the image classifications models with reasonable levels of accuracy.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The claimed invention(s) are described above with reference to example embodiments. It will be apparent to those skilled in the relevant art that various modifications may be made and other embodiments may be used without departing from any broader scope of a claim. Therefore, these and other variations upon the example embodiments are intended to be covered by the claimed invention(s), if applicable.

What is claimed is:

1. A system comprising one or more processors and memory storing instructions that, when executed by the one or more processors, cause the system to perform:
    obtaining one or more metrics associated with a network location;
    determining, based on the one or more metrics and one or more prefatory check conditions, a prefatory status of the network location, the prefatory status indicating a benign status, a malicious status, or a suspicious status;
    when the prefatory status of the network location indicates the benign status or the malicious status, providing a notification of the prefatory status in response to the prefatory status being determined;
    when the prefatory status of the network location indicates the suspicious status:
        obtaining a document object model of the network location;
        obtaining a screenshot of an entire page of content at the network location;
        generating a null hypothesis based on the document object model, the null hypothesis including a potential brand list, the potential brand list including one or more potential brands;
        obtaining a set of reference images for each of the one or more potential brands of the potential brand list;
        extracting one or more globally invariant visual features from the screenshot of the entire page of the content;
        generating, using a low code development platform (LCDP), a custom machine learning classification model, the custom machine learning classification model being generated with five or fewer images per class using a cosine similarity metric with a few-shot learning technique implemented by the LCDP;
        generating, based on the custom machine learning classification model using the one or more globally invariant visual features, an alternate hypothesis, the alternate hypothesis indicating a list of potentially malicious content brands;
        determining a classification result based on the null hypothesis, the alternate hypothesis, and the custom machine learning classification model;
        performing one or more responsive actions in response to determining the classification result.

2. The system of claim 1, wherein the network location comprises a Uniform Resource Locator (URL).

3. The system of claim 1, wherein the one or more metrics are obtained from content at the network location.

4. The system of claim 3, wherein the content comprises any of a webpage, a website, or a mobile application or other type of application.

5. The system of claim 1, wherein the set of reference images for each of the one or more potential brands comprises a plurality of examples of benign content and malicious content of a respective brand of the potential brand list.

6. The system of claim 1, wherein the one or more globally invariant visual features are selected from a group consisting of layout information of the content, a Cascading Style Sheets (CSS) template, name placement in the content, logo placement of the content, and a combination of these.

7. The system of claim 1, wherein the machine learning model comprises a few-shot learning based neural network model.

8. The system of claim 1, wherein the instructions further cause the system to perform:
    adapting the machine learning model to the set of reference images after the prefatory status is determined and prior to the extracting the one or more globally invariant visual features from the screenshot of the entire page of the content.

9. The system of claim 1, wherein the classification result comprises a binary class label indicating malicious or benign.

10. The system of claim 1, wherein the one or more responsive actions are selected from a group consisting of adding the network location to a whitelist when the class label indicates benign, adding the network location to a blacklist when the class label indicates malicious, and a combination of these.

11. A method implemented by a computing system including one or more processors and storage media storing machine-readable instructions, wherein the method is performed using the one or more processors, the method comprising:
    obtaining one or more metrics associated with a network location;
    determining, based on the one or more metrics and one or more prefatory check conditions, a prefatory status of the network location, the prefatory status indicating a benign status, a malicious status, or a suspicious status;
    if the prefatory status of the network location indicates the benign status or the malicious status, providing a notification of the prefatory status in response to the prefatory status being determined;
    if the prefatory status of the network location indicates the suspicious status:
        obtaining a document object model of the network location;
        obtaining a screenshot of an entire page of content at the network location;
        generating a null hypothesis based on the document object model, the null hypothesis including a potential brand list, the potential brand list including one or more potential brands;
        obtaining a set of reference images for each of the one or more potential brands of the potential brand list;
        extracting one or more globally invariant visual features from the screenshot of the entire page of the content;
        generating, using a low code development platform (LCDP), a custom machine learning classification model, the custom machine learning classification model being generated with five or fewer images per class using a cosine similarity metric with a few-shot learning technique implemented by the LCDP;

generating, based on the custom machine learning classification model using the one or more globally invariant visual features, an alternate hypothesis, the alternate hypothesis indicating a list of potentially malicious content brands;

determining a classification result based on the null hypothesis, the alternate hypothesis, and the custom machine learning classification model;

performing one or more responsive actions in response to determining the classification result.

12. The method of claim 11, wherein the network location comprises a Uniform Resource Locator (URL).

13. The method of claim 11, wherein the one or more metrics are obtained from content at the network location.

14. The method of claim 13, wherein the content comprises any of a webpage, a website, or a mobile application or other type of application.

15. The method of claim 11, wherein the set of reference images for each of the one or more potential brands comprises a plurality of examples of benign content and malicious content of a respective brand of the potential brand list.

16. The method of claim 11, wherein the one or more globally invariant visual features are selected from a group consisting of layout information of the content, a Cascading Style Sheets (CSS) template, name placement in the content, logo placement of the content, and a combination of these.

17. The method of claim 11, wherein the machine learning model comprises a few-shot learning based neural network model.

18. The method of claim 11, further comprising:

adapting the machine learning model to the set of reference images after the prefatory status is determined and prior to the extracting the one or more globally invariant visual features from the screenshot of the entire page of the content.

19. The method of claim 11, wherein the classification result comprises a binary class label indicating malicious or benign.

20. The method of claim 11, wherein the one or more responsive actions are selected from a group consisting of adding the network location to a whitelist when the class label indicates benign, adding the network location to a blacklist when the class label indicates malicious, and a combination of these.

* * * * *